(12) United States Patent
Ray et al.

(10) Patent No.: US 9,589,072 B2
(45) Date of Patent: Mar. 7, 2017

(54) DISCOVERING EXPERTISE USING DOCUMENT METADATA IN PART TO RANK AUTHORS

(75) Inventors: Aninda Ray, Bellevue, WA (US); Dmitriy Meyerzon, Bellevue, WA (US); Sana Fahim Khan, Bellevue, WA (US); Jessica Anne Alspaugh, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 749 days.

(21) Appl. No.: 13/150,710

(22) Filed: Jun. 1, 2011

(65) Prior Publication Data

US 2012/0310928 A1    Dec. 6, 2012

(51) Int. Cl.
*G06F 17/30* (2006.01)

(52) U.S. Cl.
CPC .............................. *G06F 17/30979* (2013.01)

(58) Field of Classification Search
CPC ....................... G06F 17/3053; G06F 17/30991
See application file for complete search history.

(56) References Cited

U.S. PATENT DOCUMENTS

| | | | |
|---|---|---|---|
| 7,139,757 B1 | 11/2006 | Apollonsky et al. | |
| 8,577,866 B1 * | 11/2013 | Osinga et al. | 707/710 |
| 2002/0169764 A1 | 11/2002 | Kincaid et al. | |
| 2006/0053142 A1 | 3/2006 | Sebbane | |
| 2007/0112720 A1 | 5/2007 | Cao et al. | |
| 2008/0195611 A1 | 8/2008 | Chen et al. | |
| 2008/0244428 A1 | 10/2008 | Fain | |
| 2009/0248662 A1 | 10/2009 | Murdock | |
| 2010/0082613 A1 | 4/2010 | Liu et al. | |
| 2010/0262610 A1 | 10/2010 | Acosta et al. | |
| 2011/0004606 A1 | 1/2011 | Aumann et al. | |
| 2011/0218037 A1 * | 9/2011 | Singh | 463/29 |
| 2012/0078906 A1 * | 3/2012 | Anand et al. | 707/737 |

FOREIGN PATENT DOCUMENTS

EP    2000925 A1    12/2008

OTHER PUBLICATIONS

Santos et al, "Mimicking Web search engines for expert search", Jan. 3, 2011, Information Processing and Management 47.*

(Continued)

*Primary Examiner* — Amresh Singh
(74) *Attorney, Agent, or Firm* — Julie Kane Akhter; Tom Wong; Micky Minhas (57) ABSTRACT

Expertise mining features are provided based in part on the use of an expertise mining algorithm and expertise mining queries. A method of an embodiment operates to provide an expanded feedback query based in part on search results using an expertise mining query and a number of author-ranking heuristics used to rank authors and/or co-authors (e.g., primary authors, secondary authors, etc.) as part of an expertise mining operation. A search system of an embodiment includes an author ranker component to rank authors based in part on an expertise mining query and author-ranking heuristics, and a query expander component to provide expanded queries as part of identifying relevant search results. Other embodiments are also disclosed.

20 Claims, 5 Drawing Sheets

(56) References Cited

OTHER PUBLICATIONS

MacDonald et al, "Using Relevance Feedback in Expert Search", 2007.*

Citeulike, "Mimicking Web search engines for expert search," Jan. 3, 2011.*

Jonathan Elsas, Retrieval and Feedback Models for Blog Distillation—Published Date: 2007 http://www.cs.cmu.edu/~jelsas/papers/CMU-TREC07-BlogDist.pdf.

Youngjoong Ko et al., An Effective Snippet Generation Method using the Pseudo Relevance Feedback Technique—Published Date: 2007 http://59.108.48.12/proceedings/sigir/sigir2007/data/pdfs/p711-ko.pdf.

Ryen W. White et al. A Comparison of Social Q&A Method. ACM Trans. on Computer-Human Interaction, vol. N/A, No. N/A, Article N/A, Pub. date: Feb. 2010.

Balog, et al., "Formal Models for Expert Finding in Enterprise Corpora", In Proceedings of the 29th Annual international ACM SIGIR Conference on Research and development in Information Retrieval, Aug. 6, 2006, 8 pages.

Cao, et al., "Research on Expert Search at Enterprise Track of TREC 2005", In Proceedings of 14th Text Retrieval conference, Nov. 15, 2005, 4 pages.

Deng, et al., "Formal Models for Expert Finding on DBLP Bibliography Data", In Eighth IEEE International conference on Data Mining, Dec. 15, 2008, 10 pages.

Errami, et al., "eTBLAST: a Web Server to Identify Expert Reviewers, Appropriate Journals and Similar Publications", In Proceedings of Nucleic Acids Research, vol. 35, Jul. 2007, 4 pages.

Fang, et al., "Probabilistic Models for Expert Finding", In Proceedings of the 29th European conference on IR research, Apr. 2, 2007, 12 pages.

Heeren, et al., "Xpertfinder—Message Analysis for the Recommendation of Contact Persons Within Defined Topics", In 6th IEEE Africon Conference in Africa, vol. 1, Oct. 2, 2002, 6 pages.

Karimzadehgan, et al., "Enhancing Expert Finding Using Organizational Hierarchies", Enhancing Expert Finding Using Organizational Hierarchies, Apr. 18, 2009, 12 pages.

McDonald, et al., "Expertise Recommender: A Flexible Recommendation System and Architecture", In Proceedings of the ACM conference on Computer Supported Cooperative Work, Dec. 2, 2000, 10 pages.

Mockus, et al., "Expertise Browser: A Quantitative Approach to Identifying Expertise", In Proceedings of the 24th International Conference on Software Engineering, May 19, 2002, 10 pages.

Yimam-Seid, et al., "Expert Finding Systems for Organizations: Problem and Domain Analysis and the DEMOIR Approach", In Journal of Organizational Computing and Electronic Commerce, vol. 13, Issue 1, Feb. 18, 2004, 23 pages.

Zhang, et al., "Expert Finding in a Social Network", In 12th International Conference on Database Systems for Advanced Applications, Apr. 9, 2007, 4 pages.

* cited by examiner

DISCOVERING EXPERTISE USING DOCUMENT METADATA IN PART TO RANK AUTHORS

BACKGROUND

Search engines enable users with a tool that can be used to locate relevant information. For example, a search engine can be used to locate documents, web sites, and other files using keywords. Conventional search engines can also be used in attempts to locate users based on keywords to return user profile records having expertise fields constructed by the users associated with the returned profile records. In the conventional case, keywords can be used by a search engine to return information that may or may not be relevant to a user's intended search result. For example, using a profile store to locate one or more users having a certain area of or level of expertise can lead to biased results due in part to the subjective nature of personal profiles.

A biased evaluation of expertise usually occurs due to self-doctoring. For example a user might consider herself to be an expert on 'Information Retrieval' and update her Skills", "Ask me about" etc. with 'Information Retrieval.' As a result, an individual may be considered as an expert by current search systems even though the individual has no collateral (documents, publications, etc.) to support such a claim. Additionally, current search systems tend to completely overlook authored documents when returning expertise information and provide little or no substantiating evidence to support the results returned. For example, a conventional search service returns a set of results with Hit-Highlighting over terms in a profile matching the user query. Such limited search capabilities provide overly constrained search results and lack promotion of user confidence in the search system or service.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments provide expertise mining features based in part on the use of an expertise mining algorithm and expertise mining queries, but the embodiments are not so limited. In an embodiment, a method operates to provide an expanded query based in part on search results using an expertise mining query and a number of author-ranking heuristics to rank authors and/or co-authors (e.g., primary authors, secondary authors, etc.) as part of an expertise mining operation. A search system of an embodiment includes an author ranker component to rank authors based in part on an expertise mining query and author-ranking heuristics, and a query expander component to provide expanded queries as part of identifying relevant search results. Other embodiments are also disclosed.

These and other features and advantages will be apparent from a reading of the following detailed description and a review of the associated drawings. It is to be understood that both the foregoing general description and the following detailed description are explanatory only and are not restrictive of the invention as claimed.

DETAILED DESCRIPTION

Embodiments provide query expansion and mining features that include using an expanded query to mine for relevant information, but the embodiments are not so limited. As described below, an expertise mining model and algorithm can be used to mine author and other information from structured and/or unstructured data structures stored in a computer storage medium according to a relevancy mining process. An expertise mining model of an embodiment includes the use of an expertise mining algorithm to identify one or more individuals having a level of expertise in an area associated with an original search query and considered as a source of information. For example, a search engine can use the expertise mining algorithm and authorship information based in part on an association that if one or more individuals have authored and/or co-authored one or more relevant items (e.g., documents, presentations, etc.) relevant to an original search query, then the one or more individuals can be identified as having a level of expertise in an area associated with the original search query and considered as a source of information.

In an embodiment, components of a processor-based search system can use document-authorship information in addition to user-profile information as part of increasing a search space by orders of magnitude to encompass richer authorship information. For example, the components can operate by searching over a document corpus in addition to using the user profile space when mining for expertise. Components of the system can be used to provide substantiating documentary evidence with the search results as part of endorsing the expertise mining model. For example, as part of returning search results using output associated with an expertise mining query, a search engine can return actual files or documents or links to provide authenticating materials to the user when mining the expertise for returned profile results. In an embodiment, as part of executing an expertise mining query, the system does not fetch documents or other items that a querying user is not authorized to use or access. The system can also operate to substantiate a claim that a returned profile result is an identified expert in a searched over subject matter, and not limited to the user's subjective profile input, due in part to authorship of authored or co-authored documents consistently ranked among top results for the query input and results of an expertise mining query. The system can be used to provide documents and other sources of evidence of expertise, since profile information can use a different query language model than the user query and may never match the query to begin with, even if a profile user is an expert.

A search system of one embodiment can be used to reduce entropy, particularly searching over large corpora, by restricting extraction operations to a defined document or item set. For example, a search system can be configured to extract author information from only certain types of search items included as part of a corpus implicitly considered well-structured, such as those used for specifications, design plans, estimates, white papers, curriculum vitae, published paper lists, citation lists, patent applications, patents, etc. As described further below, a system of an embodiment uses a number of post-processing stages to focus the quality of results including re-ranking mined authors based on certain heuristics to return a weighted set of authors as experts.

In an embodiment, components of a system operate to provide expanded query features including functionality to expand user queries using a query feedback mechanism and mining heuristics as part of providing expertise information. For example, components of a server searching environment of one embodiment can include a search engine that uses an expertise mining algorithm and author-ranking heuristics to mine for authors having a certain level of expertise in an enterprise-type profile-based setting. In one embodiment, a search engine uses an expertise mining query and an expertise mining algorithm that includes the use of a number of author-ranking post-processing stages as part of providing expanded queries and/or providing expertise information.

As described below, query expansion features can be used in conjunction with one or more original query terms to mine profile information. Expanded queries can be automatically executed and relevant results provided, or the expanded query can be suggested to the user as an expanded query suggestion for affirmative input by a user. For example, an expanded query can also be presented to a user as a suggested refinement to an existing search and run only if the user clicked a link or otherwise affirmatively selects to use the expanded query.

In an embodiment, a computing environment includes a searching interface that uses data structures stored in a computer storage medium to provide expanded queries including expertise focusing queries based in part on a query input. A searching interface of one embodiment operates in conjunction with a search server to mine and provide expertise information based in part on an expertise mining query and one or more computational post-processing stages. For example, a user can input keywords into a browser-based or other search application interface and an expertise mining algorithm can operate to provide user profile information based in part on multi-stage post-processing operations to mine expertise information without having to rely solely on subjective and often biased user input.

Figure 1:
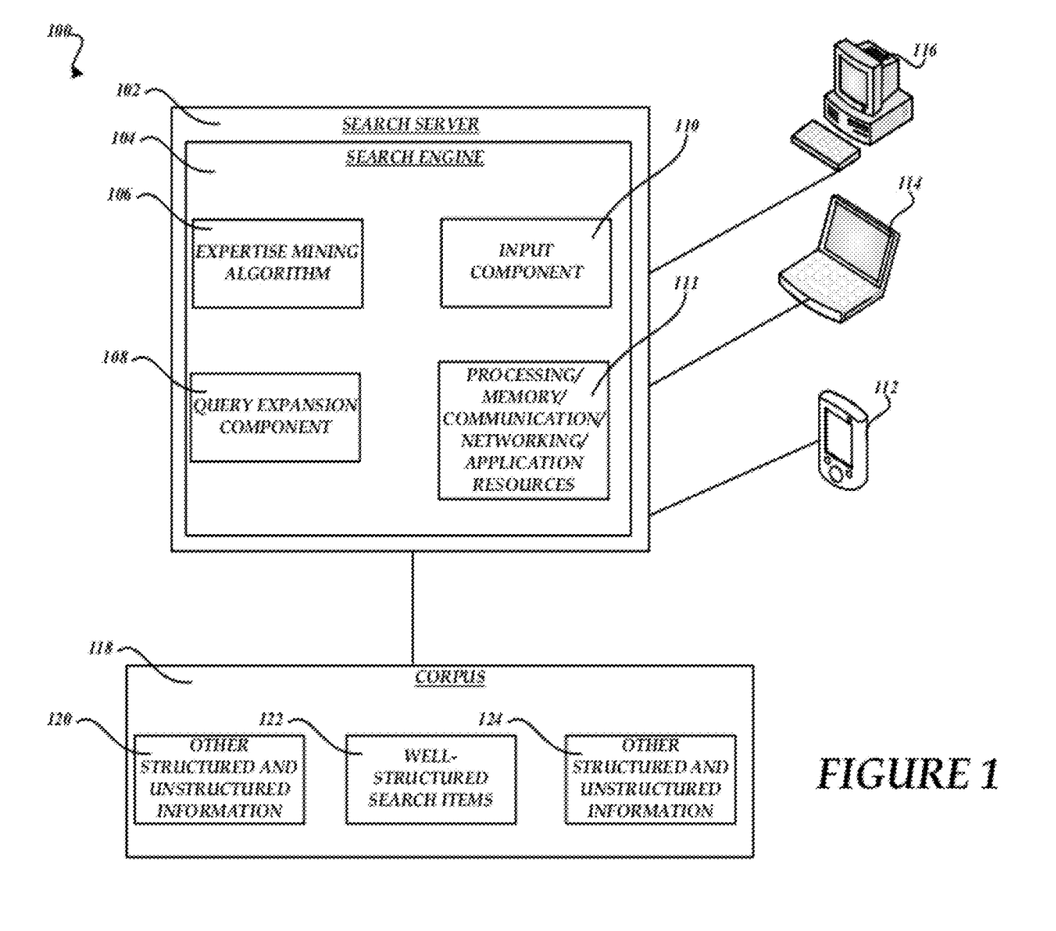
FIG. 1 is a block diagram of an exemplary search environment.

FIG. 1 is a block diagram of an exemplary search environment 100 that includes processing, memory, and other components that provide query expansion features as part of a searching operation, but is not so limited. As shown in FIG. 1, the environment 100 includes a search server 102 including a search engine 104 comprising an expertise mining algorithm 106, a query expansion component 108, an input component 110 or other parsing component(s), and/or processing/memory/communication/networking/application resources 111, but is not so limited. In addition to features described herein, the functionality of the search server 102 can include crawling, indexing and data structure population and/or maintenance services, web content management, enterprise content services, enterprise search, shared business processes, business intelligence services, and/or other features.

The input component 110 can operate in part to tokenize or otherwise parse an input query string into constituent parts, such as one or more original query terms for example. Correspondingly, the query expansion component 108 can provide expanded queries based in part on a tokenized input string. An input query provided as part of a searching operation typically contains a number of keywords or query strings. For example, if a user were searching for expertise on a new mobile phone that runs the Windows Mobile Phone 7 operating system, the user might type "Windows Mobile Phone 7 expert" into a search engine such as Microsoft's Bing search service for example. The string "Windows Mobile Phone 7 expert" is the query used to mine for expertise in this example.

In one embodiment, an input component 110 comprising a tokenizer can be included and used locally with a client. In another embodiment, the tokenizer or other parsing component can be included with server 102. It will be appreciated that different methods of tokenization, regular expression, and other parsing and/or string recognition features can be used based in part on an input language used. As an example, portions of a received query can be tokenized by a corresponding word breaker according to the query language. A word breaker algorithm can be implemented that operates to parse query inputs based in part on occurrences of white space, punctuation, and/or other parsing keys. Different word breakers can be used according to the input language and/or preferred result language. In an alternate embodiment, a pattern matching algorithm such as a regular expression that does not rely on the input string being broken into segments can be used. Or, the word breaking can also be part of the regular expression when the regular expression includes punctuation and/or whitespace or other delimiting characters. It should be noted that other textual matching technology include literal string matching, natural language parsing, and other information processing techniques can be utilized.

The query expansion component 108 can use original query terms or other output provided by the input component 110, such as user input searching terms (e.g., "Windows" "Mobile" "Phone" "7" "expert"), as part of identifying an expert in some subject matter associated with the original query terms. As described below, the query expansion component 108 can generate an expertise mining query using the original query terms to mine for expertise by executing the expertise mining query against search the corpus 118. With continuing reference to FIG. 1, a number of exemplary components are communicatively coupled to the search server 102, including a smartphone client 112, a laptop client 114, and/or a desktop client 116. Each client can use a search interface (local or web-based) to submit queries to and receive expertise mining results from the search server 102. While a limited number of clients are shown, it will be appreciated that the search server 102 can serve any number of clients. As one example, the environment 100 can include searching and indexing features used in conjunction with at least one corpus of information (exemplary corpus 118).

As shown for this example, corpus 118 includes a profile store 120 including user profile information, well-structured information or search items 122, and other structured and/or unstructured information 124 (e.g., index information, blog data, collaboration data, social networking and other social data, metadata, meta-metadata, etc.). In one embodiment, the well-structured search items 122 are used in part to extract author and co-author information include electronic documents, files, or other data structures of certain types that are deemed implicitly well-structured, such as word processing application files (e.g., .doc, .docx, etc.), spreadsheet application files, presentation application files (e.g., .ppt, .pptx, etc.), portable document format (pdf) files, hypertext markup language (HTML) documents, extensible markup language (XML) documents and/or other well-structured search items.

Such well-structured search items are often used for writing specifications/design plans/estimates/white papers, etc. as a few examples. Well-structured items typically include authorship that tends to be more accurate, often having substantial content describing expertise areas of an associated author or authors. The expertise mining model of an embodiment mines information from authored documents to increase a search space by orders of magnitude and discover experts from a significant section of a document corpus without having to limit a search solely to a user-profile store. The expertise mining model of such an embodiment can be used to boost user profiles that have authored documents most relevant to a given query. Corpus 118 can be representative of local, Intranet, and/or Internet information repositories.

In addition to identifying relevant document information, including file locations, files, metadata, and/or other relevant search items as examples, the search engine 104 operates in part using expertise mining or feedback queries to generate expanded expertise queries as part of providing relevant expertise information (e.g., user profiles, user expertise summaries or snippets, etc.) to assist a user in locating a person or persons having a particular level and/or area of expertise. The expanded query of one embodiment can be used as part of focusing a searching operation towards users having an area of expertise by encoding original search terms with one or more relevant author names to form the expanded query which the search engine 104 can use to provide relevant expertise-based results, as discussed below.

Components of the environment 100 can be used as part of searching one or more indexed data structures as part of searching for relevant information associated with a user query. It will be appreciated that the search server 102 can use one or more search indexes, such as inverted and other index data structures for example, with the expanded query. As described below, as part of a searching operation, the query expansion component 108 can operate to provide expanded expertise queries that provide further focus to an original query input. For example, components of the environment 100 can be configured to provide web-based searching features that include automatically providing user profiles associated with a particular area of expertise based in part on string inputs of one or more keywords, phrases, an/or other original search items and one or more corresponding query expertise expanders.

The query expansion component 108 can provide one or more expanded query terms or strings that can be used by the search engine 104 to provide search results to a querying user. The query expansion component 108 can use one or more original input terms as part of a query expansion and/or searching operation. For example, a user can use a computer-implemented search interface to input words, portions of words, acronyms, phrases, etc. which can be parsed and used in part to locate relevant search results, such as files, links, documents, expertise profiles, etc.

As one example, a user interface, such as a browser or search window can be used to receive typed, inked, stylus, verbal, and/or other affirmative user inputs and the query expansion component 108 can operate to provide query expertise expanders or expanding terms that include one or more author names as part of a searching operation when locating users having some area or level of expertise. An expanded query can be automatically executed, or alternatively presented to a user for affirmative selection, by the search engine 104 to focus an original query input when identifying the expertise information. As an example, one or more user profiles can be returned to the user and presented as part of a search interface so that the user can review the returned profiles and make an informed expertise decision. In an embodiment, documents and/or other items authored by the returned experts can be provided along with the profile information to substantiate a user expertise level or claim.

As described briefly above, the search engine 104 is configured in part to return expertise-based search results based in part on an expertise mining query and the expertise mining algorithm 106 used in conjunction with local and/or remote information repositories, such as both Intranet and Internet collections for example. The search engine 104 of an embodiment can use the expertise mining algorithm 106 and a pseudo-relevance expertise mining query to provide one or more user profiles from the profile store 120 as part of identifying one or more persons having certain expertise. In one embodiment, the search engine 104 executes the expertise mining query against all or some portion of the corpus 118 limited to well-structured search items, such as word processing documents, pdf documents, presentation documents, etc. having information, such as metadata for example, associated with one or more document authors. For example, author metadata is typically associated with each document as metadata to identify any associated author, such as primary and secondary authors.

As part of an expertise mining model, the search engine 104 of one embodiment can use one or more query terms or other tokens of a received query as part of generating and executing an expertise mining query to retrieve documents having specific file extensions that are identified as being most relevant to the generated expertise mining query. Such a query operates as a pseudo-relevance expertise mining query to mine expertise information. In one embodiment, the search engine 104 uses a high-proximity relevance model in conjunction with the pseudo-relevance expertise mining query as part of an expertise mining operation.

The high-proximity relevance model of one embodiment gives precedence to documents that include the query terms close to or in some defined proximity to one another. As a result, the search engine 104 uses an expertise mining query to provide a ranked list of well-structured search items. The search engine 104 of one embodiment ranks returned expertise mining query documents based in part on several managed ranking properties, such as document content, title, clicks, proximity, URL, etc. For example, the search engine 104 can use an adjustable ranking algorithm to rank the returned documents using a number of managed properties (e.g., SHAREPOINT managed properties). Thus, the search engine 104 uses the expertise mining query to provide an input result set for use with the expertise mining algorithm 106 as part of an expertise mining process.

As part of the expertise mining process using the expertise mining model, the search engine 104 uses the expertise mining algorithm 106 and one or more properties or other information from each of the ranked list of documents returned based on the original query. The original query of an embodiment is executed by the search engine 104 to provide a list of documents. Relevant authors can be extracted from the list and used to provide pseudo feedback in part to boost relevant profile records based on relevant author feedback. In one embodiment, the search engine 104 refers to properties that include Document Rank, Document Title, anchor text, Document URL, and/or Document Author List tuples. It will be appreciated that a ranked document can be authored by several individuals and/or an individual can author several ranked documents that may be relevant to a given expertise query.

Correspondingly, the search engine 104 uses the expertise mining algorithm 106 to identify the most relevant authors, since not all of the authors may have the same level of expertise. The expertise mining algorithm 106 of an embodiment uses author-ranking heuristic post-processing operations or stages and a list of extracted authors and corresponding author-ranking heuristics to rank authors of most relevant documents. A first author-ranking heuristic or post-processing stage of an embodiment operates to extract one or more authors from each document in a result set $\{D_s\}$ to provide an output of corresponding information associated with each returned document.

$$RS_Q: \{D_i | 1 \leq i \leq Top_K\}$$

$$D_i = \{\{R_i\}, \{A_{xi}, A_{yi}, \ldots A_{zi}\}\}$$

Where,
$RS_Q$—Result set for query Q
$Top_K$—Size of the Result Set
$D_i$—Document i returned as part of the Result set ($D_i$ belongs to $\{D_s\}$
$R_i$—Rank of Document i
$\{A_{xi}, A_{yi}, \ldots, A_{zi}\}$—One or more authors of Document i Based in part on the output of this stage, the search engine 104 uses the expertise mining algorithm 106 to rank the authors based in part on a cumulative rank calculation or determination for each author based in part on the ranks of all the documents so authored.

$$R(A)\langle\rangle \sum_{i=1-N_x} 1/(RD_{iA}) \quad (1)$$

Wherein,
R(A)—Rank of author A
$RD_{iA}$—Rank of document i authored by A
$N_x$—Total number of documents authored by $A_x$ where $N_x \leq Top_K$ In one embodiment, the expertise mining algorithm 106 uses equation (1) as part of normalizing the cumulative ranks and/or sorting the authors in an order (e.g., decreasing, increasing) using the corresponding normalized cumulative ranks. Using equation (1), the search engine 104 can generate a unique set of authors from the list of mined authors. Correspondingly, a mined result set or output using the first post-processing stage is $\{A_1 \{R_1\}, A_2 \{R_2\}, \ldots, A_N \{R_N\}\}$ where $(R_1 \geq R_2 \geq \ldots \geq R_N)$.

A second author-ranking heuristic or post-processing stage of an embodiment operates based in part on the output of the first post-processing stage that ranked authors based in part on a document rank and the number of documents authored. The second post-processing stage of one embodiment considers a set of heuristics to discover an association of one or more document properties or metadata with the original query resulting in the mined authors. The expertise mining algorithm 106 of one embodiment is configured to mine expertise information at the second post-processing stage based in part on an examination of document metadata and one or more terms of an original query. The expertise mining algorithm 106 of one embodiment is based in part on an assumption that the closer an association or other relation of the document metadata with an original query, the more likely an associated author of the document is an expert or is relevant to the particular expertise sought. The probability of candidate C given query Q can be defined as:

$$p(C|Q) = \sum_D p(C|D, Q)$$

Where,
p(C|D, Q)=association(C, D).
Metadata(D, Q) is the association of a candidate C with Document D, where the Document's metadata contains the one or more query terms.

In an embodiment, the search engine 104 uses as part of an author-ranking heuristic input, a document set limited to the documents that have one or more of the query terms in the Title and/or uniform source locator (URL) attributes of the authored documents. The expertise mining algorithm 106 uses this limited set of documents as elements of the input document set in the second post-processing stage. For large corpus volumes, input document set used in the second post-processing stage are typically a subset of documents returned $\{D_s\}$ as a result of the expertise mining query. An author-ranking heuristic of one embodiment considers a document title in the entirety and/or a portion of the associated URL as part of determining the input document set used for the second post-processing stage. The search engine 104 of an embodiment then extracts a list of authors from this narrowed or filtered document set and uses the expertise mining algorithm 106 to compute a coefficient to denote the relatedness or closeness of each document author to a given query.

In one embodiment, the expertise mining algorithm 106 is configured to compute a frequency measure for query terms found in the Title and/or URLs of the input document set, wherein terms identified in the title are given a higher precedence than terms in identified in the URL. In one embodiment, terms identified in a leaf node of the URL are given more importance or weight than terms identified in a parent node. The search engine 104 of one embodiment operates to normalize the resulting ranks and sort in some order (e.g., descending, ascending).

$D'\{D_i|1 \leq i \leq Top_{K'}\}$—Input document set
$Q'\{Q_i|1 \leq i \leq Top_{Q'}\}$—Query Term set
$Top_{K'}$—Total number of documents in the input document set
$Top_{Q'}$—Total number of query terms
T—Query Term present in Title
$U_L$—Query Term present in URL Leaf Node
$U_P$—Query Term present in URL Parent Node
$W_T$—Weight of Term in Title (e.g., 0.5)
$W_{UL}$—Weight of Term in leaf-node of URL (e.g., 0.25)
$W_{UP}$—Weight of Term in parent node of URL (e.g., 0.125)
Where, according to an embodiment, $W_{UP} < W_{UL} < W_T$
$Q_m$—Query Term M
$D_{nA}$—Document n authored by A
R'(A)—Rank of Author A $$R'(A) \to \sum_{m=1-Top_{Q'}} W_T \left( \sum_{n=1-Top_{K'}} T(Q_m D_{nA}) \right) +$$

$$W_{UL}\left(\sum_{n=1-Top_{K'}} U_L(Q_m D_{nA})\right) + W_{UP}\left(\sum_{n=1-Top_{K'}} U_P(Q_m D_{nA})\right)$$

As shown by the equation above, referred to as equation (2), a ranking output is provided based in part on weighted sums of query term occurrences in a document title, and portions of a document URL. Correspondingly, the search engine 104 can use the expertise mining algorithm 106 and such author-ranking heuristics to generate a unique set of authors from the list of mined authors.

Mined Result Set (second post-processing stage) is {A'1 {R'1}, A'2 {R'2}, . . . , A'N {R'N}} where (R'1≥R'2≥ . . . ≥R'N). The search engine 104 can again operate to normalize and/or sort and/or trim the results. Using the normalized results, the search engine 104 of an embodiment updates or re-ranks the author ranks by merging the result sets from the two post-processing stages, and sorts the authors in decreasing order by rank to obtain a final result set.

Final Result Set=[Mined Result Set(Stage 1)+Mined Result Set(Stage 2)]/2

Based in part on the final result set, the search engine 104 or other component can then operate to extract the top N authors from the final set and expand the original query input to provide an expanded query. Accordingly, the search engine 104 can use the expanded query to provide searchers and site owners with functionality to obtain more productive searches in a determination of some level of expertise or other mined information (e.g., customer, partner, historical data, etc.).

Using the mined result(s), the query expansion component 108 can operate to perform a query expansion operation to provide an expanded query as:

"{Original Query Text/Token} OR {{Mined Author A} OR {Mined Author B} OR {Mined Author N}}"

The search engine 104 of an embodiment can execute the expanded query against a user-profile store or other person-centric repository or repositories (e.g., social networking databases and/or sites). As one result, the expanded query resulting from using the expertise mining algorithm tends to focus on/identify user profiles of users who have authored significant documents or other structured data structures pertaining to the original query. Using the expertise mining algorithm 106, the search engine 104 can thereby boost profiles that have authored documents pertaining to the original query. Accordingly, the mined author profiles from the profile store 120 can be boosted or elevated above other profiles due in part to having authored documents most relevant to an original query input. As part of providing a confidence measure, the search engine 104 can also produce the documents (or a link) and/or other items considered while ranking the authors as evidence to an expertise claim or result, thereby promoting confidence in the expertise search.

For example, a computer display can be used to display documents that have been authored by identified experts in addition to the corresponding user-profile to give additional support and a level of confidence to the end-user in our expertise search solution. Such documentary evidence provides ready material or authentication evidence to verify or further consider the mined expertise results. As a result, using the pseudo-relevance feedback approach provided by the expertise mining model for expertise mining can increase the search space by orders of magnitude, provide relevant results even if the user-profile store is ill-maintained, and/or provide documentary evidence to end user.

The search engine 104 can use any number of relevancy algorithms as part of returning search results including links associated with files, documents, web pages, file content, virtual content, web-based content, etc. For example, the search engine 104 can use text, property information, and/or metadata when returning relevant search results associated with local files, remotely networked files, combinations of local and remote files, etc. In an embodiment, as part of a search, the search engine 104 can return a set of candidate profile results, such as a number of ranked links to candidate files or sites for example that correspond with the focus provided by the expertise mining query.

The functionality described herein can be used by or part of an operating system (OS), file system, web-based system, or other searching system, but is not so limited. The functionality can also be provided as an added component or feature and used by a host system or other application. In one embodiment, the environment 100 can be communicatively coupled to a file system, virtual web, network, and/or other information sources as part of providing searching features. An exemplary computing system that provides query expansion and searching features includes suitable programming means for operating in accordance with a method of providing mined expertise information and/or search results.

Suitable programming means include any means for directing a computer system or device to execute steps of a method, including for example, systems comprised of processing units and arithmetic-logic circuits coupled to computer memory, which systems have the capability of storing in computer memory, which computer memory includes electronic circuits configured to store data and program instructions. An exemplary computer program product is useable with any suitable data processing system. While a certain number and types of components are described above, it will be appreciated that other numbers and/or types and/or configurations can be included according to various embodiments. Accordingly, component functionality can be further divided and/or combined with other component functionalities according to desired implementations.

Figure 2:
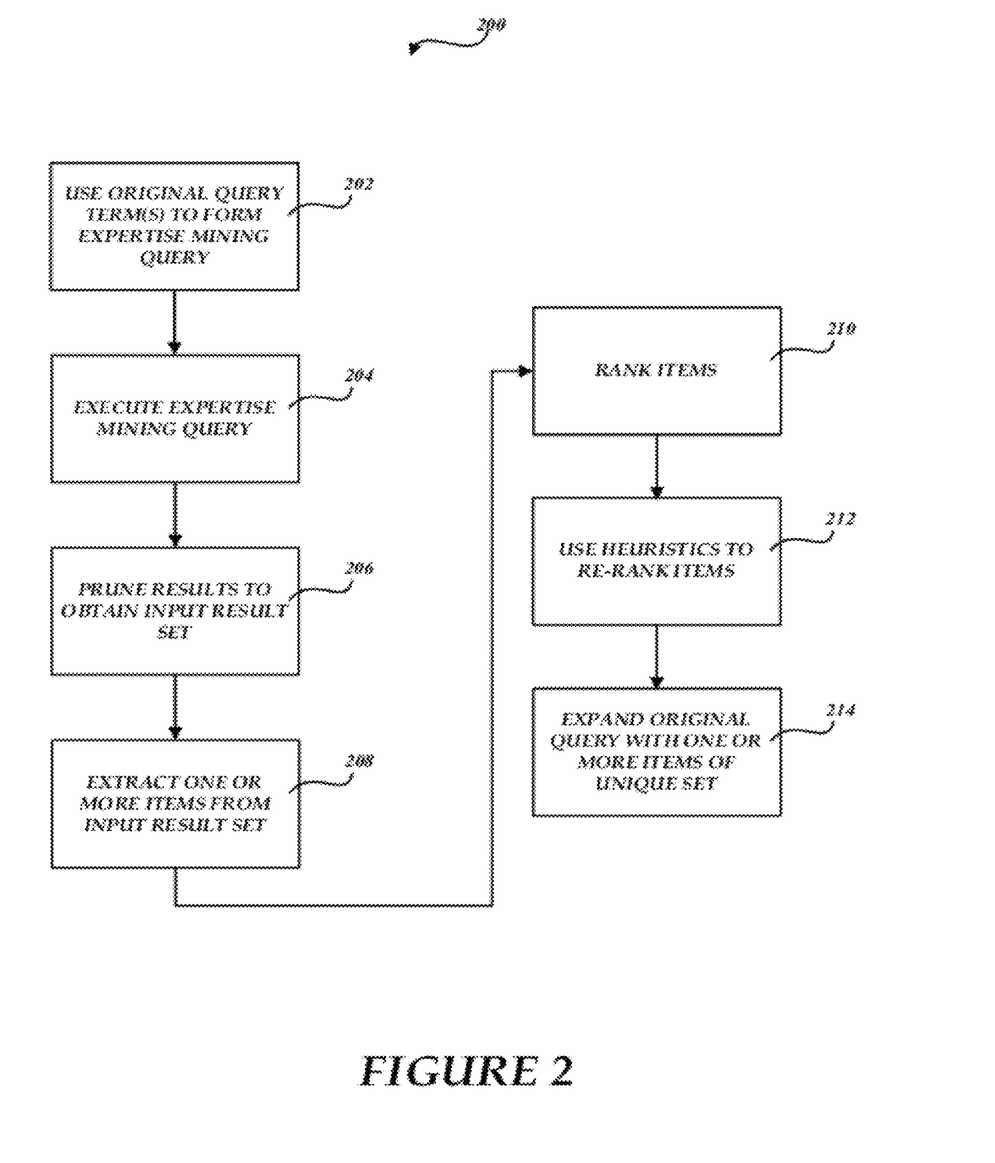
FIG. 2 is a flow diagram illustrating an exemplary process of providing expanded query features.

FIG. 2 is a flow diagram illustrating an exemplary process 200 of providing expanded query features, but is not so limited. In an embodiment, the process 200 includes functionality to provide one or more expanded query features including the use of a mining algorithm and pseudo-relevance feedback to mine expertise information as part of a search service. At 202, the process 200 receives a number of original input terms and formulates an expertise mining query.

At 204, the process 200 operates to execute the expertise mining query against a corpus of information limited to particular search item types (e.g., data structures considered well-structured). For example, the process 200 can use a networked search server to execute feedback queries using user input strings submitted using a searching interface. The process 200 at 204 of one embodiment can limit a corpus search to files having particular file extensions or formats. At 206, the process 200 of an embodiment operates to prune returned results based in part on a searching user identity or access type of a particular file to obtain an input result set (e.g., input document or file set). For example, a user ID can be used to determine if a user is prohibited from accessing certain documents or files which can then be removed from further consideration for the particular user.

At 208, the process 200 operates to extract one or more items from the input result set. For example, the process 200 at 208 can operate to extract author and co-author names from an input document set. At 210, the process 200 operates to rank the extracted items. For example, the process 200 at 210 can rank extracted authors from an input document set using an author ranking algorithm to provide a ranked list of authors based in part on a cumulative author rank for each extracted author.

At 212, the process operates to use heuristic features to re-rank the extracted items and generate a unique item set. For example, the process 200 at 212 can use author-ranking heuristics to post-process and re-rank a ranked list of authors to generate a re-ranked list of relevant authors having some level of expertise in a subject area. At 214, the process 200 operates to expand the original query input with one or more items of the unique item set. For example, the process 200 at 214 can operate to expand an original query using first and/or last author names associated with a top or designated number of normalized and sorted author results.

It will be appreciated that processing and/or networking features can assist in providing real-time searching and expertise mining features. The process 200 of an embodiment can also operate to automatically execute an expanded query without any user input other than the original query. Aspects of the process 200 can be distributed to and among other components of a computing architecture, and client, server, and other examples and embodiments are not intended to limit features described herein. While a certain number and order of operations is described for the exemplary flow of FIG. 2, it will be appreciated that other numbers and/or orders can be used according to desired implementations.

Figure 3:
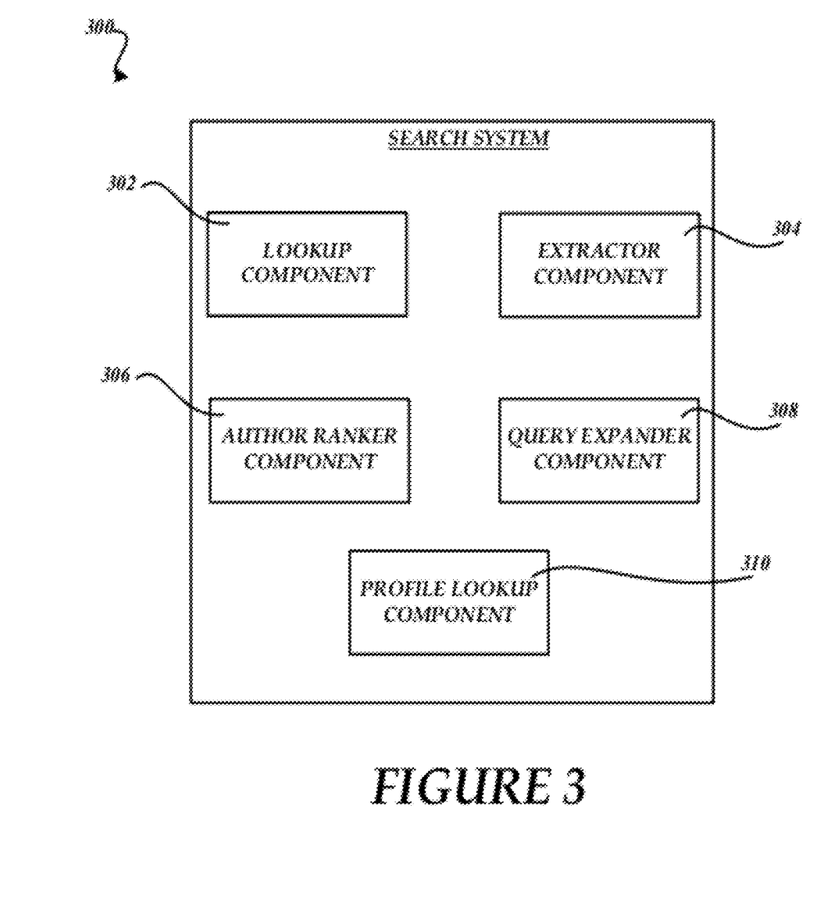
FIG. 3 is a block diagram of an exemplary search system that includes components configured to provide expertise mining and other searching features and functionality.

FIG. 3 is a block diagram of an exemplary search system 300 that includes components configured to provide expertise mining and other searching features and functionality. While a client is not shown, it will be appreciated that many types of computing devices/systems and searching interfaces can call on features of the search system 300. The search system 300 of an embodiment operates to use an expertise mining query and an expertise mining algorithm in part to mine and identify expertise information associated with an original received query including one or more original query terms. For example, a user can submit a search query including one or more query terms using a smartphone interface, laptop computer interface, desktop or other computer/communication interface to identify experts having some level of expertise in an area of interest.

As shown, the exemplary search system 300 includes, a look-up component 302, an extractor component 304, an author ranker component 306, query expander component 308, and a profile look-up component 310, but is not so limited. The query expander component 308 operates in part to use an original query input to generate an expertise mining query which is executed against a corpus of information comprising local and/or remote information repositories. The look-up component 302 of an embodiment operates to extract or provide a ranked list of documents or other authored items from the corpus of information most relevant to a given expertise mining query.

The extractor component 304 of an embodiment operates to extract a number of managed properties from a result collection associated with an expertise mining query. In one embodiment, the extractor component 304 is configured to extract a set of managed properties including, but not limited to, document rank, title, URL, and/or author information. The author ranker component 306 of an embodiment uses extracted property data and operates to rank a list of authors based in part on a rank of an authored or co-authored document and an association of the document metadata with the original query. In addition to generating expertise mining queries, the query expander component 308 of an embodiment operates to expand an original received query using a certain number of mined authors (e.g., top N mined authors after normalization and sorting).

The profile look-up component 310 of an embodiment uses the expanded query provided by the query expander component 308 to retrieve any pertinent profiles associated with expertise discovered using the original query. For example, the profile look-up component 310 can be used to extract a ranked list of profiles that are most relevant to a final expanded query. The search engine 300 can also return authored items as part of substantiating an expertise claim. While a number of components and features are described, other embodiments are included and configurable.

Figure 4:
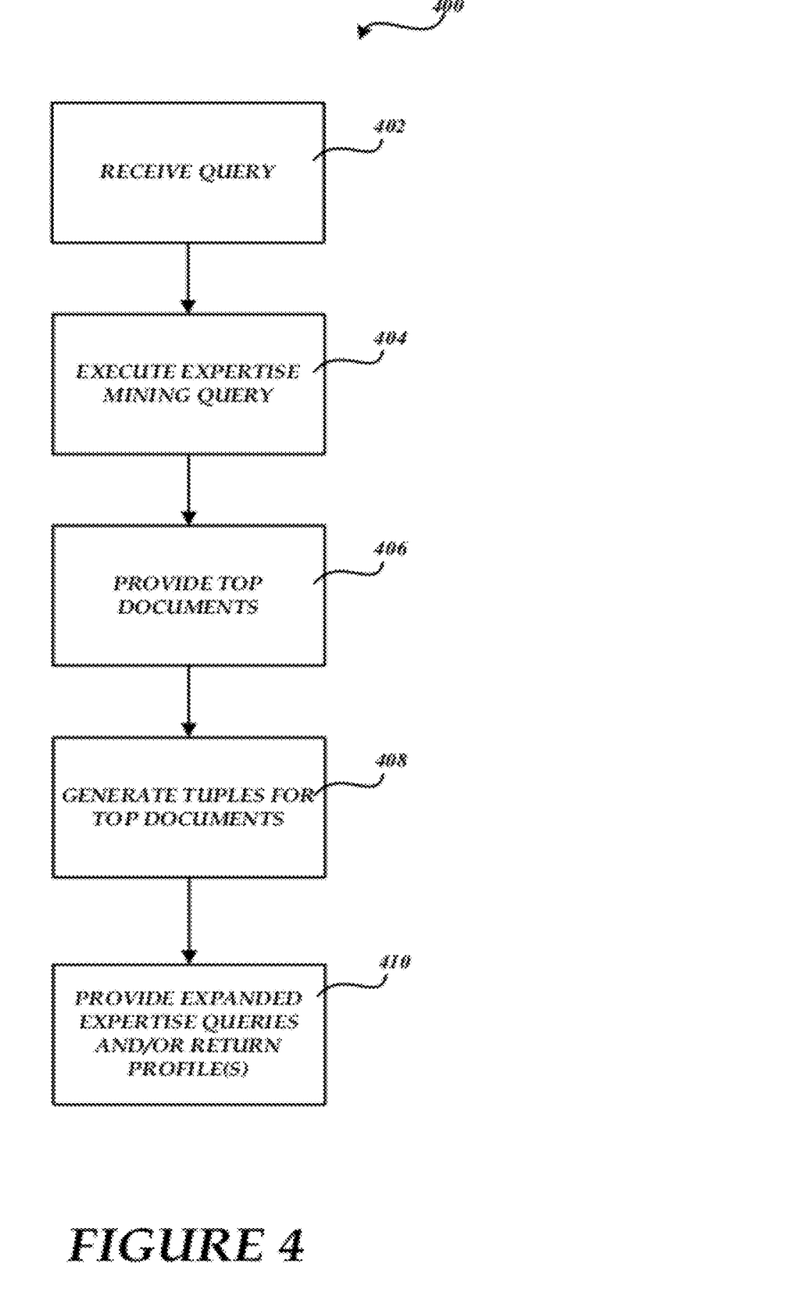
FIG. 4 is a flow diagram illustrating an exemplary process of providing expertise mining features.

FIG. 4 is a flow diagram illustrating an exemplary process 400 of providing expertise mining features including the use of an expert mining algorithm and author-ranking heuristics, but is not so limited. In an embodiment, the process 400 includes functionality to mine for expertise in a particular subject matter using the expert mining algorithm and expertise mining query results. At 402, the process 400 receives an original query input. For example, an end-user can use a search interface of a client application to submit original search queries as part of mining for expertise information.

At 404, the process 400 operates to execute an expertise mining query based on the original query input against an information repository limited to particular file types (e.g., data structures considered well-structured). For example, the process 400 at 404 can limit a corpus search to files having particular file extensions or formats (e.g., .doc., .docx, .ppt, .pptx, .pdf, and others). At 406, the process 400 operates to provide the top ranked files or documents, including removing any disqualified items (e.g., unauthorized) before providing the top ranked files. For example, a username can be used to determine if a searching user is prohibited from viewing a certain document and, if so, the document can be removed from further consideration for the particular user.

At 408, the process 400 generates a number of tuples for the top ranked files as part of ranking authors of the top ranked files resulting from the expertise mining query. In an embodiment, the process 400 at 408 uses author-ranking heuristics comprising two post-processing stages: a first post-processing stage to calculate a cumulative rank for each author based in part on ranks of corresponding files or documents authored thereby, and a second post-processing stage using a set of heuristics to discover an association of specific document metadata properties with original query terms, and ranking authors based in part the discovered association or associations. For example, as part of the second post-processing stage, the process 400 can rank authors based in part a weighted sum of variables corresponding to query terms found in specific metadata properties (e.g., Title and/or URL). At 410, the process 400 operates to provide an expanded expertise query and/or return user profiles relevant to the original expertise query.

It will be appreciated that processing and/or networking features can assist in providing real-time searching and expertise mining features. Aspects of the process 400 can be distributed to and among other components of a computing architecture, and other examples and embodiments are not intended to limit features described herein. While a certain number and order of operations is described for the exemplary flow of FIG. 4, it will be appreciated that other numbers and/or orders can be used according to desired implementations.

An illustrative example provides more insight into the expertise mining capabilities described above. Assume for this example, a search engine includes an expertise mining algorithm that uses author-ranking heuristics in part to mine for relevant expertise profiles. For example, a search engine configured with expertise mining features can be included as part of a dedicated search server environment that operates to mine author information from documents and other authored information of an enterprise that are most relevant to a given search query. By making use of document-authorship information and user-profile information, the search engine increases the search space by orders of magnitude due in part to expanding an expertise search beyond the user profile space and by considering a large portion of a searched over document corpus.

The search engine can, in addition to providing mined profile information, provide documentary evidence as part of the search results to thereby endorse or validate the results. For example, the search engine can, as part of the search results, return the actual documents used to mine the expertise of returned profile results. By providing documentary evidence, a search service can substantiate a claim that a returned profile result is an expert in the subject matter due in part to having authored documents that are consistently ranked in the top results for that query. The search engine can reduce entropy, particularly in large corpora, by also restricting a document set used to extract author information.

A search service of an embodiment uses a pseudo-relevance feedback approach to discover domain experts as part of mining for expertise. A query input can be used as a pseudo-relevance expertise mining query to mine expertise information. A high-proximity relevance model can be used in conjunction with the pseudo-relevance expertise mining query to give precedence to documents that have the query terms close to or in some defined proximity to one another. The search service of such an embodiment operates to: generate and use an expertise mining query based on an original query input; retrieve most relevant well-structured authored or co-authored documents from a corpus; extract author information from the retrieved documents; rank the extracted authors using post-processing heuristics; and, expand the original query input with a number of ranked authors (e.g., top 3, 5, 10, etc. ranked authors). The search service of one embodiment can utilize a relevance model that uses user-profile information as well as document-author information to boost profiles that have authored collateral information most relevant to a particular query. The collateral information can be provided with the search results as evidence to promote end-user confidence in the search results.

For this example, a search service can use the search engine to discover domain experts in an organization or collection of organizations. As part of the search service, the search engine executes an expertise mining query against a vanilla corpus to retrieve documents (e.g., using specific file extensions) that are most relevant to the original query terms "Phoneme" "Search" "Analysis." The search engine of one embodiment ranks the returned documents based on a ranking algorithm and one or more ranking properties to provide a number of ranked documents. For example, the search engine can use a ranking algorithm (e.g., BM25F) that relies on a number of managed properties such as Title, Content, URL, Proximity, Clicks, PageRank, Click Distance, etc. to rank returned documents, excluding any unauthorized documents.

Returning to the illustrative example, the search engine has used the expertise mining query and ranked the documents as follows:

Rank: 1; Title: People Search using Phoneme Analysis; URL: http://example.com/specs/Search/People/Phonetics/People Search using Phoneme.docx; Authors: Dick Gold, Vincent Pope, Ken Yoo.

Rank: 2: Title: Fuzzy People Name Search Analysis TDS; URL: http://example.com/specs/Search/People/TDS/People Name Search.docx; Authors: Ken Yoo, Del Kin.

Rank: 3; Title: Using the Microsoft Speech Engine Server for Phoneme Name Analysis: URL: http://example.com/Search/Phoneme Name Search Analysis.docx; Authors: Dick Gold, Don Moore.

The unique authors in order of occurrence are Dick Gold, Vincent Pope, Ken Yoo, Del Kim, and Don Moore. While all of the authors have some level of association with the given query, not all of them have the same level of expertise in the matter. Clearly, Dick Gold and Ken Yoo have authored more documents pertaining to the subject. Vincent Pope, Del Kim, and Don Moore all have authored the same number of documents; however, one author might have a higher degree of knowledge about the subject than the others. As described below, the search engine uses author-ranking heuristics to post-process and narrow down the results to identify the closest contenders.

The search engine can be programmed with functionality to ensure that certain documents that the end-user is not authorized to access are not considered or compromised. For instance, the search engine can operate as a blocking filter to prevent returning profile information of an HR manager who has written a document pertaining to the subject for a query "Guidelines to expel employees" since the HR manager is not likely relevant to a subject matter expertise sought, especially if the querying user does not have access rights for the blocked document. Thus, in one embodiment, the search engine performs a security trim of all the documents that are returned as part of the pseudo-relevance expertise mining query looking for such issues. For example, a claims identity application and a user identifier can be used to prune a list of document results returned before performing further post-processing operations.

After any necessary pruning, for this example, the search engine uses the following managed properties tuples: <Document Rank, Document Title, Document URL, and/or Document Author List> tuples.

Which, for this example, are:

<1, People Search using Phoneme Analysis, http://example.com/specs/Search/People/Phonetics/People Search using Phoneme.docx, {Dick Gold, Vincent Pope, Ken Yoo}>, <2, Fuzzy People Name Search Analysis TDS, http://example.com/specs/Search/People/TDS/People Name Search.docx, {Ken Yoo, Del Kin}>, <3, Using the Microsoft Speech Engine Server for Phoneme Name Analysis, http://example.com/Search/Phoneme Name Search Analysis.docx, {Dick Gold, Don Moore}>, As shown by this illustrative example, a ranked document can be authored by several individuals and/or an individual can author several documents that may be relevant to a given input query. The search engine can use an expertise mining algorithm to identify the most relevant authors and/or co-authors, since they may not all have the same level of expertise being mined. The expertise mining algorithm of an embodiment uses a list of extracted authors and the author-ranking heuristics to rank authors of the most relevant or pertinent documents according to the particular ranking algorithm.

The first post-processing stage of one embodiment operates to extract one or more authors from each document in the result set to provide an output of corresponding information associated with each document, where:

Continuing the above example, the output is as follows:
D1—(Rank=1; Authors: {Dick Gold, Vincent Pope, Ken Yoo})
D2—(Rank=2; Authors: {Ken Yoo, Del Kin})
D3—(Rank=3; Authors: {Dick Gold, Don Moore})

Based in part on the output, the search engine of an embodiment uses equation (1) to rank the authors based in part on a cumulative rank calculation for each author that is based on the ranks of all the documents authored by them. Where, the cumulative rank of an author is equal to a sum of the inverse of the rank of each document authored or co-authored by a particular individual as shown by equation (1).

For this example, the cumulate rank for each extracted authors is as follows:
Author: Dick Gold; Rank=1/1+1/3=1.33
Author: Vincent Pope; Rank=1/1=1
Author: Ken Yoo; Rank=1/1+1/2=1.5
Author: Del Kin; Rank=1/2=0.5
Author: Don Moore; Rank=1/3=0.33

The search engine can normalize the cumulative ranks and/or sort the authors in decreasing or increasing order using the corresponding normalized cumulative ranks.

For this example, the normalized cumulative ranks are:
Author: Ken Yoo; Rank=1 (1.5/1.5)
Author: Dick Gold; Rank=0.887 (1.33/1.5)
Author: Vincent Pope; Rank=0.67 (1/1.5)
Author: Del Kin; Rank=0.33 (0.5/1.5)
Author: Don Moore; Rank=0.22 (0.33/1.5)

Thus, the search engine can generate a unique set of authors from the list of mined authors. The mined result set from the first post-processing stage is: {Ken Yoo, Dick Gold, Vincent Pope, Del Kin, and Don Moore} in decreasing order of rank.

The second post-processing stage uses the output of the first post-processing stage that includes ranked authors based in part on a document rank and the number of documents authored. The second post-processing stage considers a set of heuristics to discover an association or relation of one or more document metadata properties with the original query terms that were used to generate the expertise mining query and ultimately the ranked author list information. For example, the search engine can mine expertise at the second post-processing stage based in part on an assessment of document metadata and one or more original query terms or strings. The expertise mining algorithm of one embodiment uses an assumption that the closer or proximal an association the document metadata with the original query, the more likely an associated author of the document is an expert or relevant to the particular expertise sought.

The search engine of an embodiment can use a document or item set limited to the documents or items that have one or more of the query terms in the Title and/or URL attributes of the document properties. The search engine uses this limited set of documents as elements of the input document set for the second post-processing stage. Continuing the example above, the documents that have one or more of the original query (and expertise mining query) terms {Phoneme, Search, Analysis} in the Title and/or URL are shown as underlined below:

D1—People Search using Phoneme Analysis, http://example.com/specs/Search/People/Phonetics/People Search using Phoneme.docx
D2—Fuzzy People Name Search Analysis TDS, http://example.com/specs/Search/People/TDS/People Name Search.docx
D3—Using the Microsoft Speech Engine Server for Phoneme Name Analysis, http://example.com/Search/Phoneme Name SearchAnalysis.docx The search engine then extracts a list of authors from this document set.

For this example, the list is as follows:
D1—{Dick Gold, Vincent Pope, Ken Yoo}
D2—{Ken Yoo, Del Kin}
D3—{Dick Gold, Don Moore}

The search engine then computes a coefficient to denote the closeness or relatedness of each document author to a given query.

Using equation (2), and for this example, the search engine has determined a total occurrence output:

For Dick Gold:
Occurrence of "Phoneme" in all documents authored by Dick=(0.5*2+0.25*2+0.125*0)=1.5; Occurrence of "Search" in all documents authored by Dick=(0.5*1+0.25*2+0.125*2)=1.25; Occurrence of "Analysis" in all documents authored by Dick=(0.5*2+0.25*1+0.125*0)=1.25.

Thus, a total occurrence or Rank for Dick Gold=4.00
For Vincent Pope; Rank=(0.5*1+0.25*1+0.125*0)+(0.5*1+0.25*1+0.125*1)+(0.5*1+0.25*0+0.125*0)=2.125
For Ken Yoo; Rank=(0.5*1+0.25*1+0.125*0)+(0.5*2+0.25*2+0.125*2)+(0.5*2+0.25*0+0.125*0)=3.5
For Del Kin; Rank=0+(0.5*1+0.25*1+0.125*1)+(0.5*1+0.25*0+0.125*0)=1.375
For Don Moore; Rank=(0.5*1+0.25*1+0.125*0)+(0.5*0+0.25*1+0.125*1)+(0.5*1+0.25*1+0.125*0)=1.825

Mined Result Set (second post-processing stage) is then {Dick Gold, Ken Yoo, Vincent Pope, Don Moore, Del Kin} in decreasing order of occurrence or rank.

The search engine can then normalize and/or sort the results.

For this example, the normalized and sorted output of the search engine is:
Dick Gold: 1 (4/4)
Ken Yoo: 0.875 (3.5/4)
Vincent Pope: 0.531 (2.125/4)
Don Moore: 0.456 (1.825/4)
Del Kin: 0.343 (1.375/4)

Using the normalized results, the search engine updates the author ranks by merging the result sets from the two stages, and then sorts the authors in decreasing order by rank to obtain a final result set.

For the example above:

| Stage 1 results: | Stage 2 results: |
| --- | --- |
| Ken Yoo; Rank = 1 | Dick Gold: Rank = 1 |
| Dick Gold; Rank = 0.887 | Ken Yoo: Rank = 0.875 |
| Vincent Pope; Rank = 0.67 | Vincent Pope: Rank = 0.531 |
| Del Kin; Rank = 0.33 | Don Moore: Rank = 0.456 |
| Don Moore; Rank = 0.22 | Del Kin: Rank = 0.343 |

Summing and dividing by the number of post-processing stages (two for this example) to obtain the final result set output for this example:
Dick Gold—0.943
Ken Yoo—0.937

Vincent Pope—0.6
Don Moore—0.338
Del Kin—0.336

Based in part on the final result set, the search engine can then operate to extract some number (e.g., top N) of the authors from the set to expand the original query input to provide an expanded query. The search engine of an embodiment can then be programmed to execute an expanded query against a user-profile store or other person-centric repository or repositories (e.g., social networking databases and sites). As one result, the expanded query tends to focus on/identify user profiles of users who have authored significant documents or other well-structured data structures pertaining to an original query.

For this example, the search engine provides an expanded query (for N=3):

Expanded query={Phoneme Search Analysis} OR {{Dick Gold} OR {Ken Yoo} OR {Vincent Pope}}

As shown by the foregoing illustrative example, the search engine has operated to boost profiles that have authored documents pertaining to the original query. Dick Gold, Ken Yoo and/or Vincent Pope may or may not have profile information mentioning them as experts in "Phoneme Search Analysis". However, due in part to the use of the expertise mining algorithm, the mined author profiles can be boosted or elevated above other profiles due in part to having authored documents most relevant to the original input query. As part of providing a confidence measure, the search engine can also produce the documents and/or other items considered while ranking the authors as evidence to an expertise claim or result, thereby inducing confidence in the search system.

While certain embodiments are described herein, other embodiments are available, and the described embodiments should not be used to limit the claims. Exemplary communication environments for the various embodiments can include the use of secure networks, unsecure networks, hybrid networks, and/or some other network or combination of networks. By way of example, and not limitation, the environment can include wired media such as a wired network or direct-wired connection, and/or wireless media such as acoustic, radio frequency (RF), infrared, and/or other wired and/or wireless media and components. In addition to computing systems, devices, etc., various embodiments can be implemented as a computer process (e.g., a method), an article of manufacture, such as a computer program product or computer readable media, computer readable storage medium, and/or as part of various communication architectures.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.). Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store information and which can be accessed by a computing device. Any such computer storage media may be part of device.

The embodiments and examples described herein are not intended to be limiting and other embodiments are available. Moreover, the components described above can be implemented as part of networked, distributed, and/or other computer-implemented environment. The components can communicate via a wired, wireless, and/or a combination of communication networks. Network components and/or couplings between components of can include any of a type, number, and/or combination of networks and the corresponding network components include, but are not limited to, wide area networks (WANs), local area networks (LANs), metropolitan area networks (MANs), proprietary networks, backend networks, etc.

Client computing devices/systems and servers can be any type and/or combination of processor-based devices or systems. Additionally, server functionality can include many components and include other servers. Components of the computing environments described in the singular tense may include multiple instances of such components. While certain embodiments include software implementations, they are not so limited and encompass hardware, or mixed hardware/software solutions. Other embodiments and configurations are available.

Exemplary Operating Environment

Figure 5:
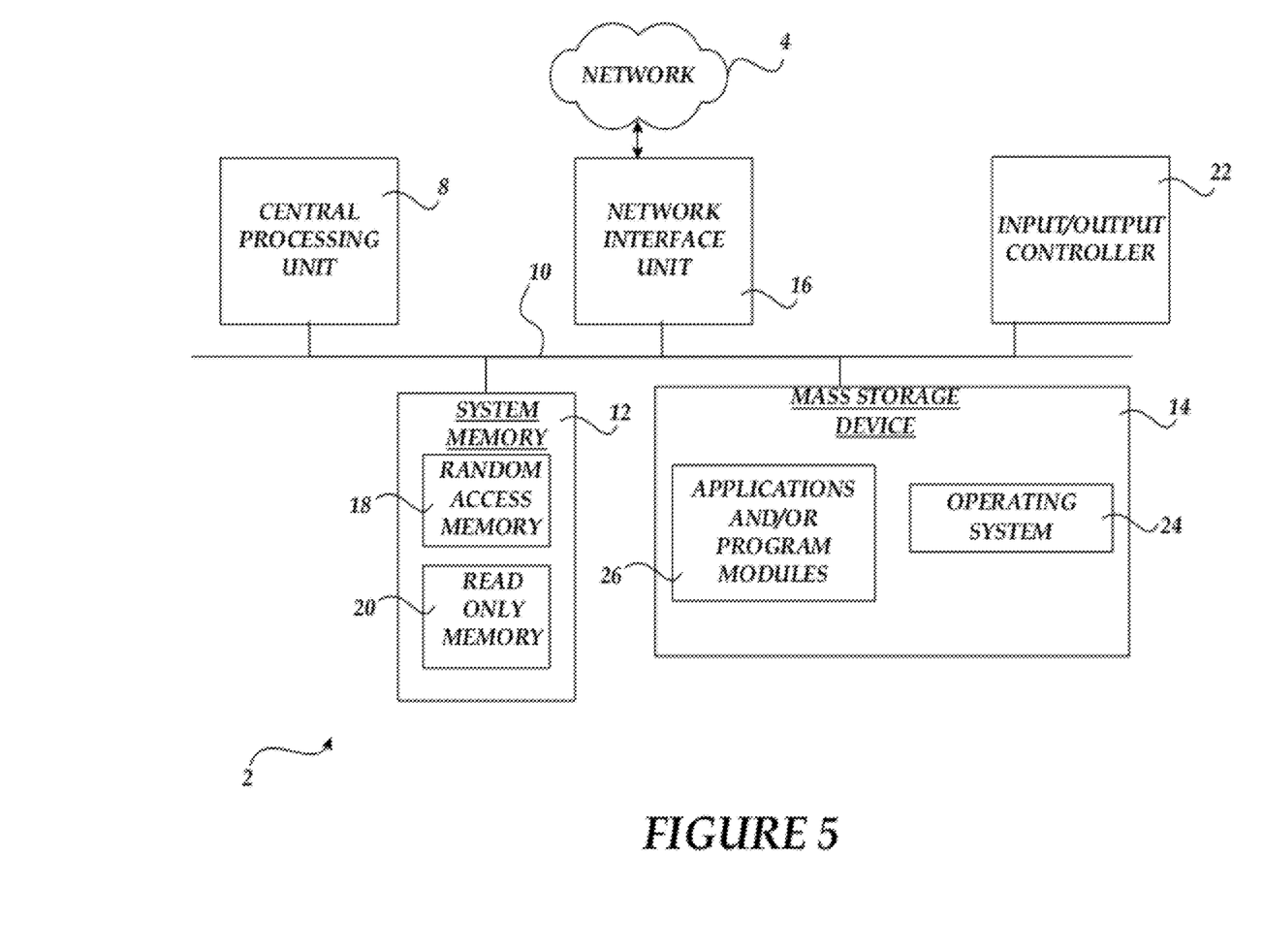
FIG. 5 is a block diagram illustrating an exemplary computing environment for implementation of various embodiments described herein.

Referring now to FIG. 5, the following discussion is intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 5, an illustrative operating environment for embodiments of the invention will be described. As shown in FIG. 5, computer 2 comprises a general purpose server, desktop, laptop, handheld, or other type of computer capable of executing one or more application programs. The computer 2 includes at least one central processing unit 8 ("CPU"), a system memory 12, including a random access memory 18 ("RAM") and a read-only memory ("ROM") 20, and a system bus 10 that couples the memory to the CPU 8. A basic input/output system containing the basic routines that help to transfer information between elements within the computer, such as during startup, is stored in the ROM 20. The computer 2 further includes a mass storage device 14 for storing an operating system 24, application programs, and other program modules.

The mass storage device 14 is connected to the CPU 8 through a mass storage controller (not shown) connected to the bus 10. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed or utilized by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 4, such as a local network, the Internet, etc. for example. The computer 2 may connect to the network 4 through a network interface unit 16 connected to the bus 10. It should be appreciated that the network interface unit 16 may also be utilized to connect to other types of networks and remote computing systems. The computer 2 may also include an input/output controller 22 for receiving and processing input from a number of other devices, including a keyboard, mouse, etc. (not shown). Similarly, an input/output controller 22 may provide output to a display screen, a printer, or other type of output device.

As mentioned briefly above, a number of program modules and data files may be stored in the mass storage device 14 and RAM 18 of the computer 2, including an operating system 24 suitable for controlling the operation of a networked personal computer, such as the WINDOWS operating systems from MICROSOFT CORPORATION of Redmond, Wash. The mass storage device 14 and RAM 18 may also store one or more program modules. In particular, the mass storage device 14 and the RAM 18 may store application programs, such as word processing, spreadsheet, drawing, e-mail, and other applications and/or program modules, etc.

It should be appreciated that various embodiments of the present invention can be implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, logical operations including related algorithms can be referred to variously as operations, structural devices, acts or modules. It will be recognized by one skilled in the art that these operations, structural devices, acts and modules may be implemented in software, firmware, special purpose digital logic, and any combination thereof without deviating from the spirit and scope of the present invention as recited within the claims set forth herein.

Although the invention has been described in connection with various exemplary embodiments, those of ordinary skill in the art will understand that many modifications can be made thereto within the scope of the claims that follow. Accordingly, it is not intended that the scope of the invention in any way be limited by the above description, but instead be determined entirely by reference to the claims that follow.

What is claimed is:

1. A method comprising:
using one or more search terms of an original query to generate an expertise mining query;
executing the expertise mining query to create search results;
filtering the search results based in part on a user identification;
identifying well-structured search items from the filtered search results;
ranking authors associated with the well-structured search items using an expertise mining algorithm comprising:
a first post-processing stage to:
calculate a cumulative rank calculation for each author based in part on a document rank and a number of authored documents, and
generate a first author ranking output based on the cumulative rank calculation; and
a second post-processing stage to:
identify an association between the first author ranking output and the original query, and
generate a second author ranking output based on the identified association,
wherein the identified association is based in part on occurrences of one or more of the search terms in title and uniform source locator (URL) attributes of the first author ranking output;
determining one or more ranked authors by merging the first author ranking output from the first post-processing stage and the second author ranking output from the second post-processing stage; and
automatically providing one or more expanding query terms with the original query including one or more of the ranked authors to provide an expanded query for use in mining expertise information.

2. The method of claim 1, further comprising receiving the original query from a search interface including one or more original search terms and returning a weighted set of authors as experts.

3. The method of claim 1, further comprising automatically executing the expanded query to generate search results that satisfy the expanded query including providing one or more user profiles and documentary evidence as part of the search results.

4. The method of claim 3, further comprising automatically executing the expanded query to provide user profile information including any authored documents used to mine profiles based on the expanded query.

5. The method of claim 1, further comprising using the expertise mining algorithm and the first and second post-processing stages to rank and update author ranks by merging author ranking result sets from the first and second post-processing stages.

6. The method of claim 1, further comprising extracting a list of authors from search results associated with the expertise mining query and using the expertise mining algorithm to compute a coefficient corresponding to a relation of each document author to the original query.

7. The method of claim 6, further comprising updating author ranks by merging result sets from the first and second post-processing stages, and sorting the updated author ranks in an order by rank to obtain a final result set including one or more user profiles.

8. The method of claim 1, further comprising limiting the execution of the expertise mining query to well-structured search items including word processing application files, spreadsheet application files, portable data files, and presentation application files.

9. The method of claim 1, further comprising ranking authored files including documents based on results of the expertise mining query, extracting authors from a number of the ranked authored files, ranking the extracted authors, re-ranking the extracted authors using URL, author, and title tuples, and providing the expanded query using the one or more search terms and one or more re-ranked authors.

10. The method of claim 1, returning authored files or links to the authored files as part of ranking authors having a level of expertise as part of providing substantive evidence pertaining to an expertise type.

11. The method of claim 1, further comprising generating the expanded query using one or more query expertise expanders including one or more first and last author names.

12. The method of claim 1, further comprising using metadata to identify primary and secondary authors for returned authored documents based in part on the expertise mining query, a total number of documents authored by each author, and an output associated with weighted sums of query term occurrences in a document title and URL portions of each ranked document.

13. The method of claim 1, further comprising using an association of document metadata with the original query as part of determining that an associated author of the document is relevant to a particular expertise sought by the original query including ranking authors by:

$$R'(A) \to \sum_{m=1-Top_{Q'}} W_T\left(\sum_{n=1-Top_{K'}} T(Q_m D_{nA})\right) +$$
$$W_{UL}\left(\sum_{n=1-Top_{K'}} U_L(Q_m D_{nA})\right) + W_{UP}\left(\sum_{n=1-Top_{K'}} U_P(Q_m D_{nA})\right)$$

where,
$Top_{K'}$—Total number of documents in an input document set,
$Top_{Q'}$—Total number of query terms,
T—Query Term present in Title,
$U_L$—Query Term present in URL Leaf Node,
$U_P$—Query Term present in URL Parent Node,
$W_T$—Weight of Term in Title,
$W_{UL}$—Weight of Term in leaf-node of URL,
$W_{UP}$—Weight of Term in parent node of URL,
$Q_m$—Query Term M,
$D_{nA}$—Document n authored by A, and
R' (A)—Rank of Author A.

14. A search system comprising:
at least one processor and memory;
a query expander component to generate feedback queries and expanded queries based in part on one or more original query terms;
an extractor component to:
  filter well-structured search items identified using an expertise mining query, the filtering based in part on a user identification; and
  extract information from the well-structured search items;
an author ranker to rank authors based in part on a rank of an authored or co-authored document and an association of document metadata with the one or more original query terms, wherein the author ranker uses an expertise mining algorithm comprising:
  a first post-processing stage to rank authors and provide a first author ranking output based in part on a document rank and a plurality of authored documents, and
  a second post-processing stage to identify an association between the first author ranking output and the one or more original query terms, and generate a second author ranking output based on the identified association,
  wherein the identified association is based in part on occurrences of one or more of the original query terms in title and uniform source locator (URL) attributes of the first author ranking output, and
  wherein the author ranker determines one or more ranked authors by merging the first author ranking output from the first post-processing stage and the second author ranking output from the second post-processing stage; and
a lookup component to use an expanded query to identify one or more user profiles identified as having expertise in an area of interest based on the one or more relevant authors.

15. The search system of claim 14, the author ranker further configured to rank authors based in part on a combination of relevance of an authored document to a given query, relevance of certain portions of document metadata to the given query, and a number of authored documents for each mined author.

16. The search system of claim 14, further comprising a document lookup component to provide documentary evidence, or a link thereto, of author expertise for mined profiles.

17. The search system of claim 14, the author ranker component further configured to use author-ranking heuristics to identify relevant mined authors.

18. An article of manufacture, excluding a signal, that stores instructions which, when executed, operate to:
generate an expertise mining query using one or more original query terms;
execute the expertise mining query to create search results, wherein the executing is limited to well-structured search items;
filter the search results based in part on a user identification;
rank expertise mining query results to provide ranked expertise mining query results;
extract author information from a top number of the ranked expertise mining query results;
use author-ranking heuristics to rank the author information and provide one or more ranked authors based on an expertise mining algorithm comprising:
  a first post-processing stage configured to rank authors and provide a first author ranking output based in part on a document rank and a plurality of authored documents, and
  a second post-processing stage to identify an association between the first author ranking output and the one or more original query terms, and generate a second author ranking output based on the identified association, and
  wherein the identified association is based in part on occurrences of one or more of the search terms in title and uniform source locator (URL) attributes of the first author ranking output;

determine one or more ranked authors by merging the first author ranking output from the first post-processing stage and the second author ranking output from the second post-processing stage; and generate an expanded query using a top number of the one or more ranked authors.

19. The article of manufacture of claim 18, that stores instructions which, when executed, operate to automatically execute the expanded query against a profile store.

20. The article of manufacture of claim 19, that stores instructions which, when executed, operate to automatically provide authenticating evidence for each returned profile resulting from executing the expanded query.

* * * * *